United States Patent
Brimble et al.

(10) Patent No.: US 10,006,576 B2
(45) Date of Patent: Jun. 26, 2018

(54) QUICK CONNECT/DISCONNECT ADAPTOR SYSTEM

(71) Applicant: Fiskars Oyj Abp, Helsinki (FI)

(72) Inventors: Robert R. Brimble, Edwards, IL (US); Charles A. Lehmann, Metamora, IL (US); Lawrence P. Heren, East Peoria, IL (US); Kalyan Vedantam, Peoria, IL (US)

(73) Assignee: Fiskars Oyj Abp, Helsinki (FI)

( * ) Notice: Subject to any disclaimer, the term of this patent is extended or adjusted under 35 U.S.C. 154(b) by 447 days.

(21) Appl. No.: 14/702,542

(22) Filed: May 1, 2015

(65) Prior Publication Data

US 2015/0338007 A1 Nov. 26, 2015

Related U.S. Application Data

(60) Provisional application No. 61/987,923, filed on May 2, 2014.

(51) Int. Cl.
*F16L 37/14* (2006.01)
*F16L 21/08* (2006.01)
(Continued)

(52) U.S. Cl.
CPC .............. *F16L 37/14* (2013.01); *F16L 21/00* (2013.01); *F16L 21/08* (2013.01); *F16L 37/004* (2013.01);
(Continued)

(58) Field of Classification Search
CPC ....... F16L 37/23; F16L 37/113; F16L 37/107; F16L 21/08; F16L 37/252
(Continued)

(56) References Cited

U.S. PATENT DOCUMENTS 1,913,971 A * 6/1933 Benn ...................... F16L 37/107
285/349
2,248,701 A * 7/1941 Fowler .................. F16L 37/107
285/376
(Continued)

FOREIGN PATENT DOCUMENTS

FR 2724213 A3 3/1996
GB 0 834 229 A 5/1960
(Continued)

OTHER PUBLICATIONS

International Search Report and Written Opinion, PCT/IB2015/001427, Fiskars Oyj Abp, 19 pages dated (Jan. 19, 2016).
(Continued)

*Primary Examiner* — David Bochna
(74) *Attorney, Agent, or Firm* — Foley & Lardner LLP (57) ABSTRACT

Various systems, methods, and apparatuses provided herein relate to quick connect and disconnect adaptor systems. The system includes a male member having a locking collar, a pin attached to the locking collar, and a locking mechanism; a female member selectively coupled to the male member, the female member having a locking device and a body defining a groove; wherein the locking collar of the male member at least partially surrounds the body of the female member when coupled to facilitate the groove receiving the pin and the locking mechanism to engage with the locking device.

11 Claims, 11 Drawing Sheets

(51) Int. Cl.
*F16L 21/00* (2006.01)
*F16L 37/00* (2006.01)
*F16L 37/086* (2006.01)
*F16L 37/252* (2006.01)
*F16L 37/107* (2006.01)
*F16L 37/113* (2006.01)
*F16L 37/127* (2006.01)
*F16L 37/23* (2006.01)

(52) U.S. Cl.
CPC .......... *F16L 37/086* (2013.01); *F16L 37/107* (2013.01); *F16L 37/113* (2013.01); *F16L 37/127* (2013.01); *F16L 37/23* (2013.01); *F16L 37/252* (2013.01)

(58) Field of Classification Search
USPC ................................................ 285/402, 277
See application file for complete search history.

(56) References Cited

U.S. PATENT DOCUMENTS

| | | | | |
|---|---|---|---|---|
| 2,461,700 A | * | 2/1949 | Scheiwer | F16L 37/23 137/614.03 |
| 2,727,759 A | * | 12/1955 | Elliott | F16L 37/23 285/316 |
| 2,864,628 A | * | 12/1958 | Edleson | F16L 37/107 137/614.04 |
| 2,926,934 A | * | 3/1960 | Gill | F16L 37/23 285/276 |
| 3,589,673 A | * | 6/1971 | Cruse | F16L 37/23 251/149.1 |
| 5,056,560 A | * | 10/1991 | DeMartelaere | F16L 37/23 137/614.04 |
| 9,599,267 B2 | * | 3/2017 | Dude | F16L 37/0982 |
| 2004/0028395 A1 | | 2/2004 | Hagihara | |

FOREIGN PATENT DOCUMENTS

| | | | |
|---|---|---|---|
| GB | 2 069 083 A | 8/1981 | |
| WO | WO-2013002699 A1 * | 1/2013 | ............. F16L 37/23 |

OTHER PUBLICATIONS

English-language machine translation of FR 2724213-A3, Intertechnique dated (Mar. 8, 1996).

* cited by examiner

UPPER FEMALE BODY

TOP PORTION — FEATURE OF SOME SORT TO RETAIN PART WHEN OVER MOLDED BY LOWER PORTION

FIG. 34

OVER MOLDED LOWER PORTION OF BODY

FULL OPEN

HALF OPEN

QUICK CONNECT/DISCONNECT ADAPTOR SYSTEM

CROSS-REFERENCE TO RELATED APPLICATIONS

This application claims the benefit of U.S. Provisional Patent Application No. 61/987,923, filed May 2, 2014, which is incorporated herein by reference in its entirety.

FIELD

The disclosure relates generally to a quick connect/disconnect adaptor system, and more particularly to a quick connect/disconnect faucet adaptor and method of manufacturing thereof.

BACKGROUND

Quick connect/disconnect adaptor systems can be used to facilitate the connection and disconnection of male and female connectors, particularly connectors used when connecting a hose to a source of liquid. For instance, a house typically includes a sillcock which delivers water from inside the house to the outside of the house and which is usually located at or near the foundation of the house. Oftentimes, this location can make it difficult to thread a hose to the faucet which is coupled to the sillcock, since the location can be difficult to access. Consequently, quick connect/disconnect adaptor systems can be purchased by a homeowner to reduce the difficulty in attaching a hose to the faucet.

Typically, the adaptor system includes a first assembly which screws on to the faucet such that a threaded male portion of the faucet mates with a threaded female portion of the first assembly. A second assembly is attached to the hose and often includes a threaded female portion which accepts a threaded male portion of the hose which receives the water from the inside of the house.

The first assembly and second assembly, mate with one another, but typically not in a threaded fashion. Instead, the first assembly and second assembly are coupled together through insertion of the second assembly into the first assembly where the two assemblies are held together in watertight fashion by either a press-fit or by a partial rotation of one assembly with respect to the other assembly. The partial rotation of one assembly with the other acts to sealingly engage the first assembly to the second assembly to prevent leakage.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure are related to quick connect/disconnect systems and methods for connecting and disconnecting water dispensing devices. The devices can be hoses, faucets, tubes, pipes, sprinklers, nozzles, wands, and other garden hose attachments. The system includes a main body which is connected to the source of fluid, such as water, and an adaptor, which is coupled to a delivery device, such as a hose.

One embodiment relates to a quick connect and disconnect adaptor system. The system includes a male member having a locking collar, a pin attached to the locking collar, and a secondary locking mechanism. The system also includes a female member selectively coupled to the male member, the female member having a body defining a groove and a secondary locking device, wherein the locking collar of the male member at least partially surrounds the body of the female member when the female member and male member are coupled together, such that the groove receives the pin and the secondary locking mechanism engages with the secondary locking device.

Another embodiment relates to a quick connect and disconnect adaptor system. The system includes a male member having a tail and a locking collar, wherein the locking collar is coupled to a pin, and wherein the locking collar at least partially surrounds the tail to define an opening between the tail and the locking collar; and, a female member selectively connected with the male member, the female member having a body defining a groove, wherein engagement of the pin to the groove connects the male member to the female member.

Still another embodiment relates to a quick connect and disconnect adaptor system. The system includes a female member defining at least one pocket; a male member selectively engageable with the female member, the male member having at least one pin, wherein engagement of the at least one pin with the at least one pocket couples the female member to the male member; and a secondary locking collar coupled to the male member and operable to selectively lock the at least one pin of the male member in the at least one pocket of the female member.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains. Is should also be understood that while dimensions are shown, the dimensions are not considered to be limiting and other dimensions are considered to be within the scope of the present invention.

Figure 1:
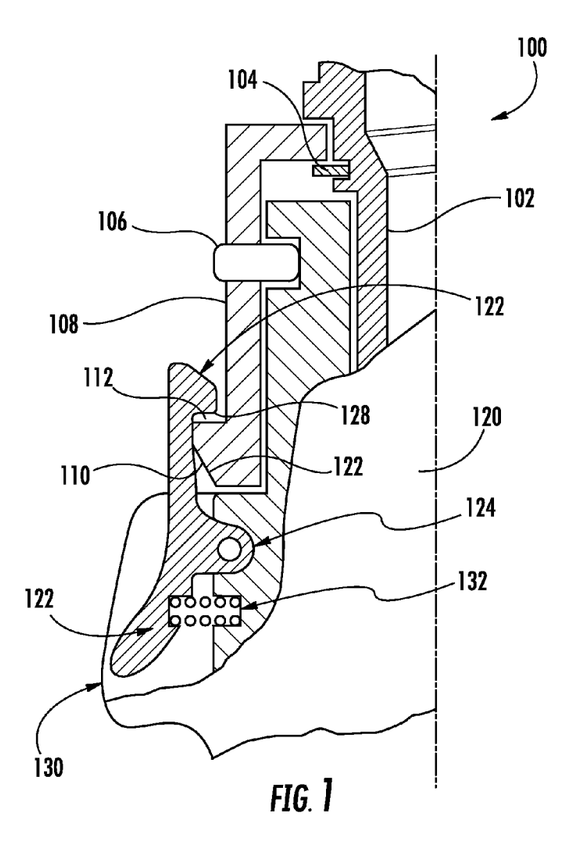
FIG. 1 is a partial cross-sectional view of a quick connect/disconnect adaptor system particularly well suited for applications requiring an enhanced lock with internal seals and structures omitted for clarity, according to an exemplary embodiment.

FIG. 1 illustrates one embodiment of a quick connect/disconnect adaptor system 100 that is particularly well suited for applications requiring an enhanced lock such as air lines, industrial applications, etc. If desired, one or more secondary locks may be provided. The quick connect/disconnect adaptor system 100 includes a male tail 102 with a retaining ring 104, a locking pin 106, and a male locking collar 108 with an angled face 110 and a locking shelf 112.

An upper female body 120 includes a locking lever 122 which is pivotably connected to the upper female body 120 by a pivot pin 124. The locking lever 122 includes an angled face 126 and a locking shelf 128. A guard portion 130 of the locking lever 122 is biased by a spring return 132.

In operation, the male tail 102 is inserted into the upper female body 120 and the locking pins follow helical grooves to the locking pocket. As the collar rotates onto the female body and the two angled faces come into contact, the locking lever is forced outwardly and snaps back by the biasing of the spring return such that the locking shelves are in opposition. The system is unlocked by depressing the guard against the biasing force of the spring and then pulling the male tail out of the upper female body.

Figure 2:
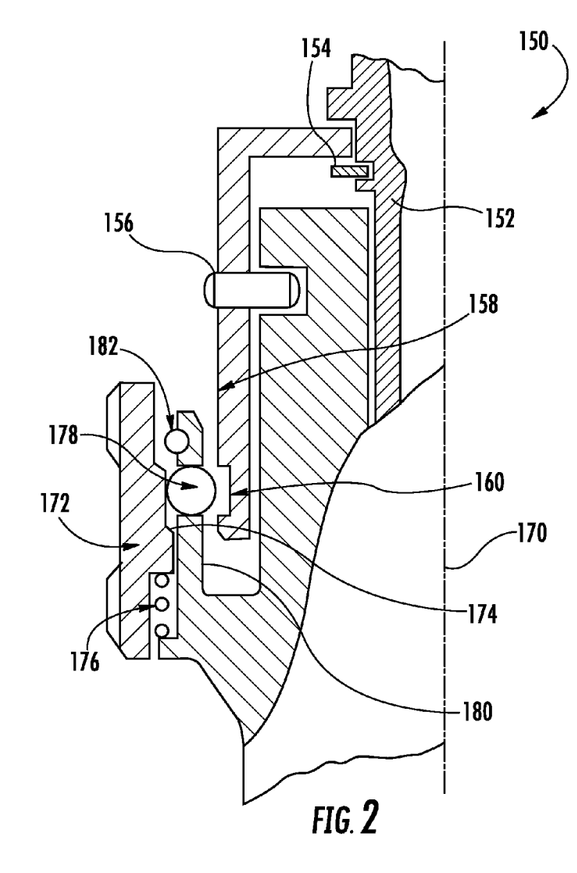
FIG. 2 is a partial cross-sectional view of a quick connect/disconnect adaptor system with a secondary lock, according to an exemplary embodiment.

FIG. 2 depicts a quick connect/disconnect adaptor system 150 with a secondary lock. The quick connect/disconnect adaptor system 150 includes a male tail 152 with a retaining ring 154, a locking pin 156, and a male locking collar or ring 158 with a locking groove 160.

An upper female body 170 includes a locking collar 172 which is axially movable along the upper female body 170. The locking collar 172 includes an angled face 174. The locking collar 172 is biased by a spring return 176. A locking sphere 178 is located within a bore of an inner ring 180. A retaining ring 182 provides an axial stop for the locking collar 172.

In operation, the lock collar is pulled downwardly (as depicted in FIG. 2) allowing the locking sphere (or spheres) to move outwardly. The leak-free male and female can now be connected. As the male locking collar is inserted within the opening located inwardly of the inner ring, the male locking collar forces the locking sphere outwardly. Once the locking groove is aligned with the bore in the inner ring, the locking collar 172 is released and the spring return forces the angled face against the locking sphere forcing the locking sphere into the locking groove. To unlock the system, the female locking collar is pulled back against the spring and the male tail is pulled away from the female body. This forces the locking sphere outwardly, allowing the male tail to be removed. In some embodiments, the lower portion of the locking groove is angled to facilitate forcing the locking sphere outwardly.

Figure 3:
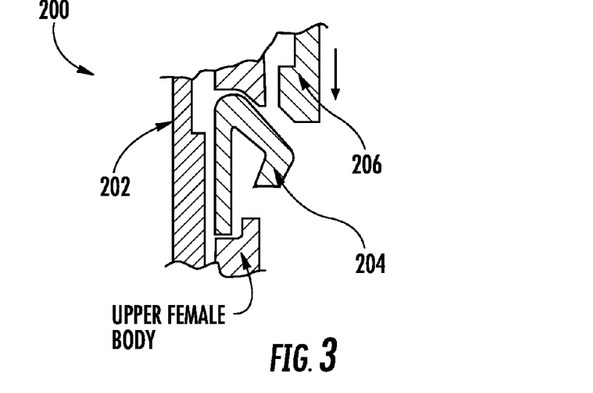
FIGS. 3-6 depict an embodiment which incorporates plastic components in place of the locking sphere of FIG. 2, according to an exemplary embodiment.
Figure 4:
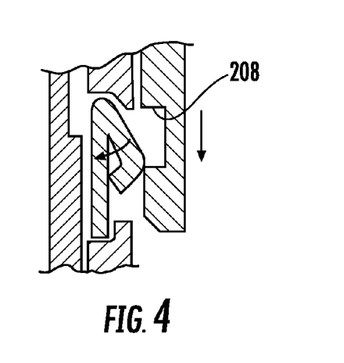
Figure 5:
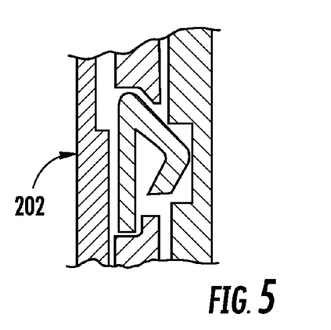
Figure 6:
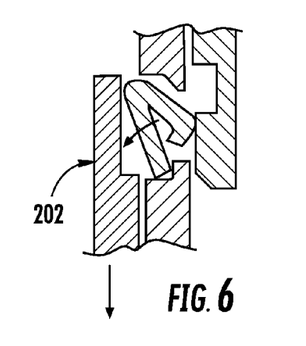

FIGS. 3-6 depict an embodiment which incorporates plastic components in place of the locking sphere which is typically metal. In these embodiments, the female locking collar 202 is not pulled backwardly to allow for connection. Rather, the male component is simply inserted into the female component. Disengagement follows the normal practice of first pulling back the female lock collar. In FIG. 3, the female locking collar 202 is up supporting the locking tooth 204 and male locking ring 206 is being inserted. In FIG. 4, the male locking ring is flexing the locking tooth outwardly. In FIG. 5 the male locking ring is fully inserted and the locking tooth snaps back into the locking groove 208 on the male locking collar. In FIG. 6, the female locking collar is pulled downwardly allowing the locking tooth to be force outwardly.

Figure 7:
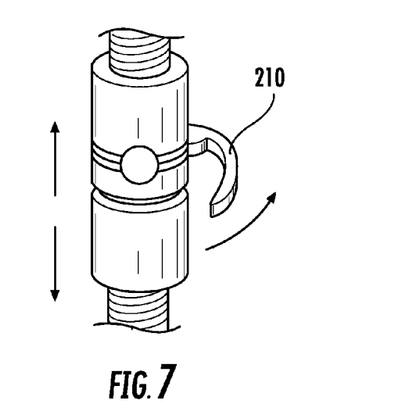
FIG. 7 depicts a cam locking configuration for a quick connect/disconnect adaptor system, according to an exemplary embodiment.
Figure 8:
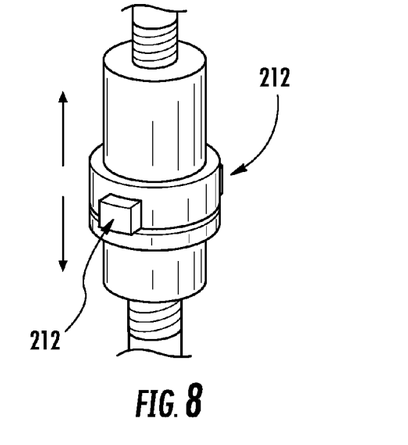
FIG. 8 depicts an opposing button locking configuration for a quick connect/disconnect adaptor system, according to an exemplary embodiment.
Figure 9:
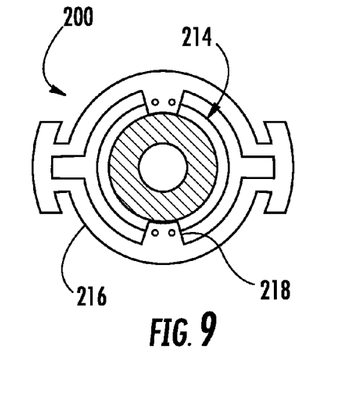
FIGS. 9 and 10 depict an internal structure which can be used with the embodiments of FIGS. 8 and 9, according to an exemplary embodiment.
Figure 10:
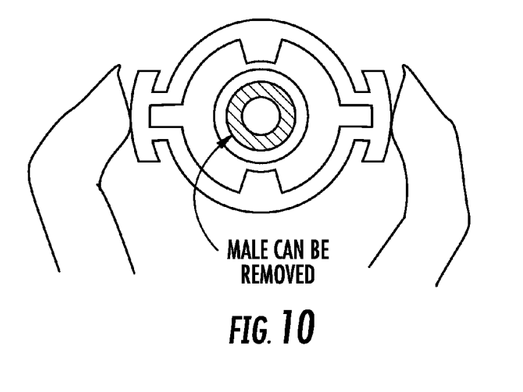

In some embodiments, a cam locking configuration 210 is incorporated as depicted in FIG. 7. FIG. 8 depicts a locking configuration based upon squeezing opposing buttons 212. The two configurations can incorporate similar internal configurations such as the configuration shown in FIGS. 9 and 10 which is explained with an opposing button structure. As shown in FIG. 9, the male component includes a locking groove defining a locking shelf 214 while the female component includes a flexible locking ring 216 which is oval shaped in a resting or locked configuration. The flexible locking ring 216 includes two teeth 218 which engage the locking shelf 214 in the locked configuration. By applying force to the opposing buttons 212, the flexible locking ring 216 is deformed into a circular shape which spreads the teeth 218 outwardly, allowing the male component to be removed as depicted in FIG. 10. Insertion is allowed by applying pressure to the opposing buttons, and inserting the male component to a location whereat the teeth 218 are aligned with the locking groove. The buttons are then released allowing the flexible ring to snap into its resting configuration thereby forcing the teeth 218 into the groove in opposition to the locking shelf 214.

Figure 11:
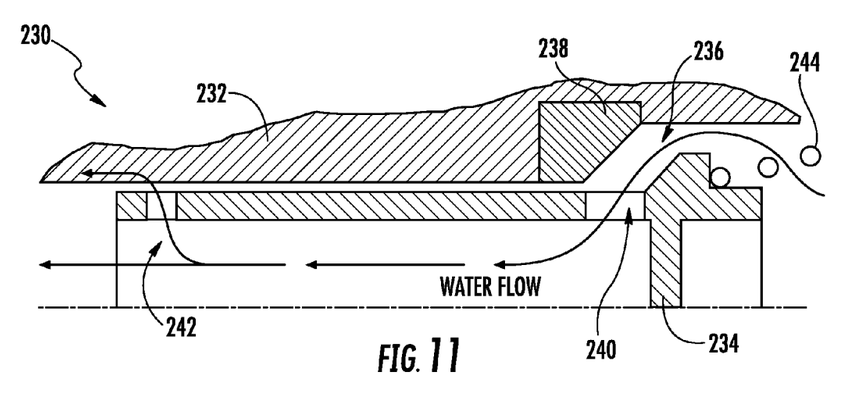
FIG. 11 depicts a quick connect/disconnect adaptor system incorporating a shuttle and a filter, according to an exemplary embodiment.

FIG. 11 depicts a system 230 incorporating a shuttle and a filter. In the embodiment of FIG. 11, insertion of the male component into the female component 232 forces the shuttle 234 further into the female component (to the right as depicted in FIG. 11). This creates a gap 236 between the shuttle and a seal 238 through which water flows. The water path is through several holes 240 in the shuttle wall to the interior of the shuttle and then out through another set of holes 242. In some embodiments, a filter (not shown) is inserted within the holes 240. The water going through the holes 242 would already have been filtered at the holes 240, and so additional filters are typically not needed. Alternatively, the filter may be located farther upstream, such as between the seal 238 and the spring 244. In order to prevent water from passing along the outside of the shuttle 234, the seal 238 in some embodiments is further configured to seal against the outer wall of the shuttle 234. In some embodiments, a separate seal is additionally or alternatively located downstream (to the left in FIG. 11) of the seal 238 to seal against the outer wall of the shuttle 234. In this embodiment the filter is changed typically by disassembly of the female coupling.

Figure 12:
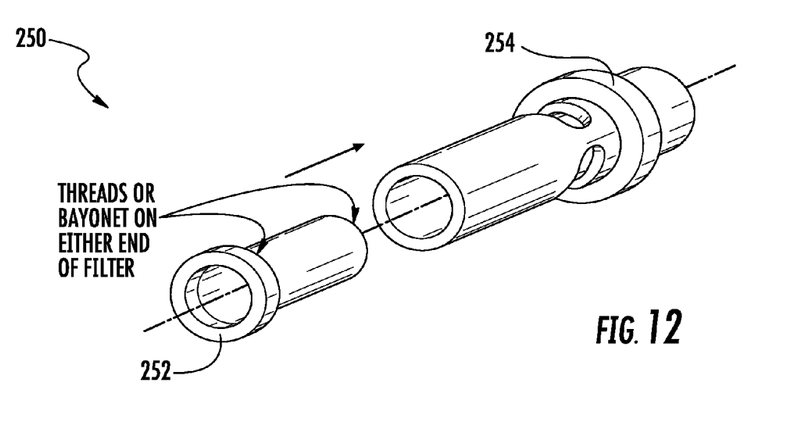
FIG. 12 depicts a quick connect/disconnect adaptor system which incorporates a removable/replaceable filter, according to an exemplary embodiment.

FIG. 12 depicts a quick connect/disconnect adaptor system 250 which includes a filter 252 which is threaded into the interior of the shuttle 254. Alternatively, the filter is attached by a bayonet configuration. The system of FIG. 12 allows the filter to be inserted from the front of the female component, eliminating the need for disassembly of the coupling to change or replace the filter. While in some embodiments the filter is simply friction fit within the shuttle, as the filter fills or clogs, there will be an increased back-pressure which could dislodge the filter. Providing threaded or bayonet type attachment inhibits dislodgement.

Figure 13:
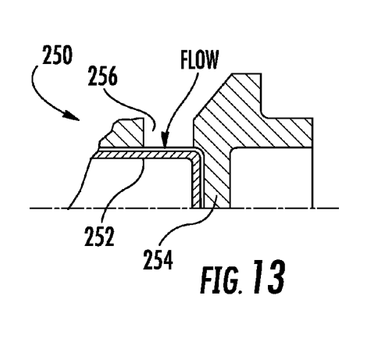
FIG. 13 depicts an embodiment where a filter is configured to extend to the holes in the shuttle for a quick connect/disconnect adaptor system, according to an exemplary embodiment.
Figure 14:
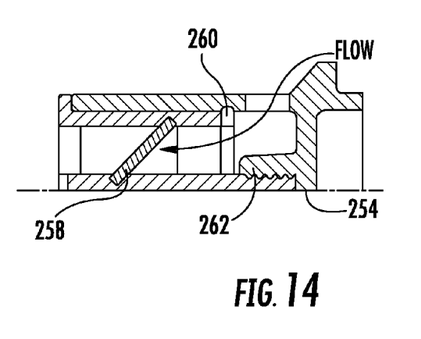
FIG. 14 depicts an embodiment where a filter is located within a shuttle to provide a debris trap in a quick connect/disconnect adaptor system, according to an exemplary embodiment.

In one embodiment, the filter 252 is configured to extend to the holes 256 in the shuttle 254 as shown in FIG. 13. In another embodiment shown in FIG. 14, a filter assembly provides a filter 258 positioned within the shuttle 254. This configuration provides a debris trap within the shuttle which allows for additional debris to be collected before substantially clogging the filter 258. In FIG. 14, a seal 260 is provided to force water through the filter. Additionally, while the retaining feature in some embodiments is located near the downstream end of the shuttle, in FIG. 14 threads 262 are depicted at the upstream end of the shuttle. Additionally, the filter 258 may be positioned with a different angle than the one shown in FIG. 14. In one embodiment, the filter 258 is curved with a central apex located at the right side as depicted in FIG. 14 to provide a debris trap completely around the outer circumference of the filter. The shuttle/filter assembly in some embodiments is keyed to provide a specific orientation of the filter.

Figure 15:
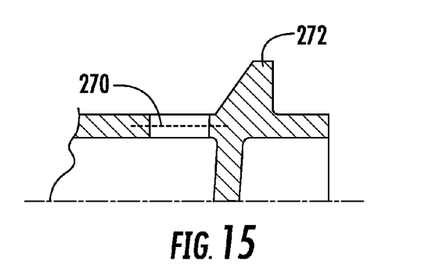
FIG. 15 depicts a filter integrally formed with a shuttle for a quick connect/disconnect adaptor system, according to an exemplary embodiment.
Figure 16:
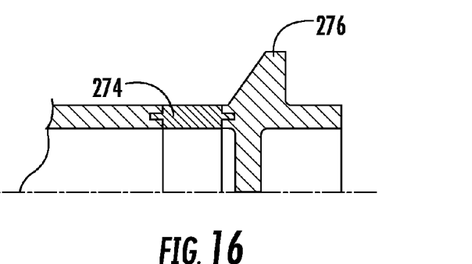
FIG. 16 depicts a filter over-molded into a shuttle for a quick connect/disconnect adaptor system, according to an exemplary embodiment.
Figure 17:
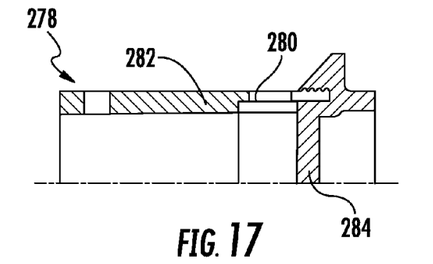
FIGS. 17 and 18 depict an embodiment where a shuttle is provided as a two-piece configuration with a replaceable filter or portion for a quick connect/disconnect adaptor system, according to an exemplary embodiment.
Figure 18:
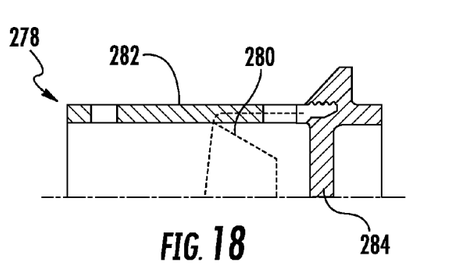

In some embodiments as shown in FIGS. 15 and 16 the filter is integral with the shuttle. In FIG. 15, the filter 270 is integrally formed with the shuttle 272 while in FIG. 16 the filter 274 is over-molded into the shuttle 276. FIGS. 17 and 18 depict an embodiment where a shuttle 278 is provided as a two-piece configuration. A filter 280 is attached to a first shuttle portion 282 which is threadedly engaged with a second portion 284 of the shuttle. When the filter 280 is clogged, the shuttle portion 282 is simply disengaged from the shuttle portion 284 as depicted in FIG. 18 and replaced. Alternatively, only the filter 280 is replaced.

The filter described above may include, in various embodiments, a variety of materials and configurations. In different embodiments, one or more of the filters include one or more of woven fabric mesh, woven plastic fiber mesh, molded plastic grid/mesh, woven metal mesh, porous plastic material, porous metal material, porous ceramic material, porous elastomer, and porous naturally formed material such as sponge, pumice, etc.

In embodiments which are used with transported materials which generate static electricity, such as a dry particulate materials or fluid materials with additives, the couplings described herein are further provided with a grounding method or attachment point.

In some embodiments, the couplings are configured for attachment with, or formed integrally with, one or more metering devices such as flow meters, temperature sensors, pressure sensors, etc. For embodiments allowing attachment, ports are provided. The port may be configured to provide an in-line coupling. By integrally forming the device, however, size, volume, labor, and other costs may be reduced.

For embodiments with metal outer components, the metal portion may become hot to the touch when exposed to the sun. Accordingly, in some of these embodiments a soft outer over-mold is provided. In addition to providing thermal protection from sun exposure, the over-mold or outer sleeve provides thermal insulation and a more comfortable grip. The over-mold also provides increased gripping in wet conditions as well as insulating against static discharge. In some embodiments, the over-mold is color coded to indicate the type of material which is transported. In further embodiments, the over-mold is color coded to indicate the temperature of the transported material. In some embodiments, the over mold material is selected to vary in color as the temperature of the over-mold varies.

By incorporating an over-mold, product information is easily included in the over-mold. Other information may also be included such as arrows indicating directions for how to turn the component to engage/disengage the system, and a lock indicator, caution notes. The over-molding may be textured for improved gripping or provided with a decorative finish.

Moreover, an over-mold can be provided in embodiments which are substantially or completely plastic, with many of the same benefits identified above.

Figure 19:
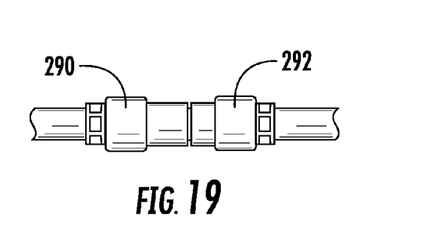
FIG. 19 depicts a quick connect/disconnect adaptor system with partial over-molds, according to an exemplary embodiment.
Figure 20:
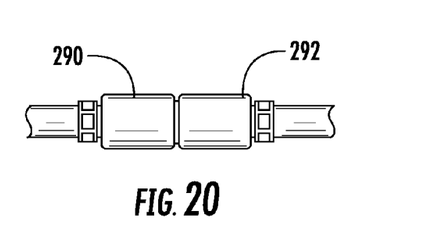
FIG. 20 depicts a quick connect/disconnect adaptor system with full over-molds, according to an exemplary embodiment.

The extent of the over-mold can vary according to the intended use of the system. By way of example, FIG. 19 depicts a system with partial over-molds 290 which provide for additional grip, but leave portions of the system exposed. FIG. 20 depicts a system with full over-molds 292 which provide for additional grip while providing thermal protection. Color coding can be used with either the partial or full over-mold.

Of course, when the system of FIG. 20 is disconnected, the male portion will be exposed and can still be hot. Moreover, in applications where the system is used around finished surfaces, such as on boats, aesthetic damage from the exposed male portion may also be a concern. The embodiment of FIGS. 21-22 addressed such concerns.

Figure 21:
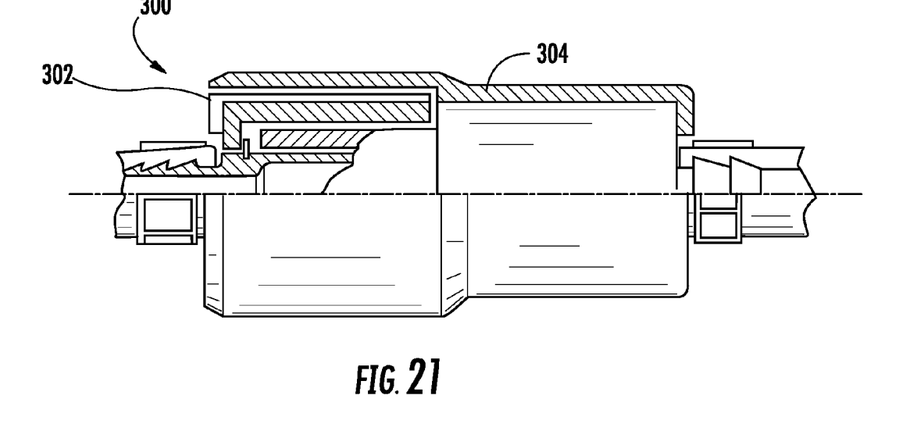
FIGS. 21-22 depict a quick connect/disconnect adaptor system with a full male portion over-mold and a female over-mold which extends over the male over-mold, according to an exemplary embodiment.
Figure 22:
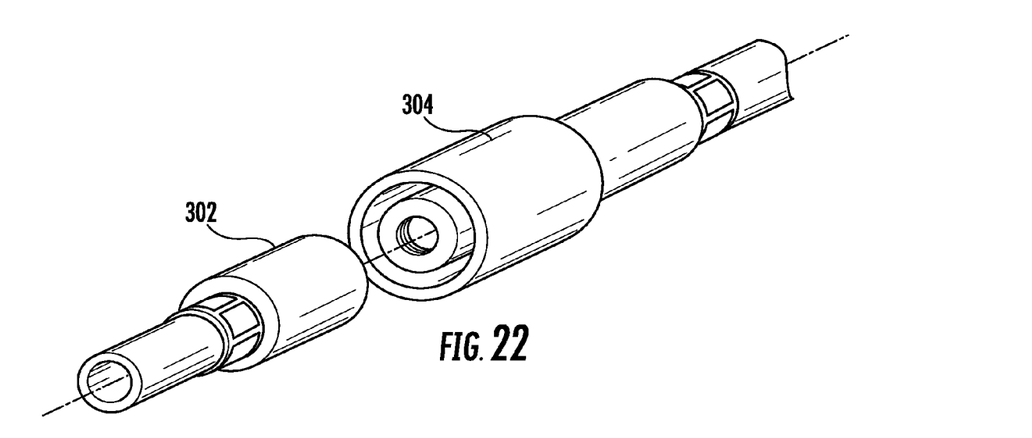

In FIGS. 21-22, system 300 includes a male portion with a full over-mold 302. The female portion likewise has a full over-mold 304 which extends over the male over-mold. Accordingly, even when disconnected the male portion is protected by an over-mold thereby providing thermal protection and reducing the potential for damaging other objects.

Figure 23:
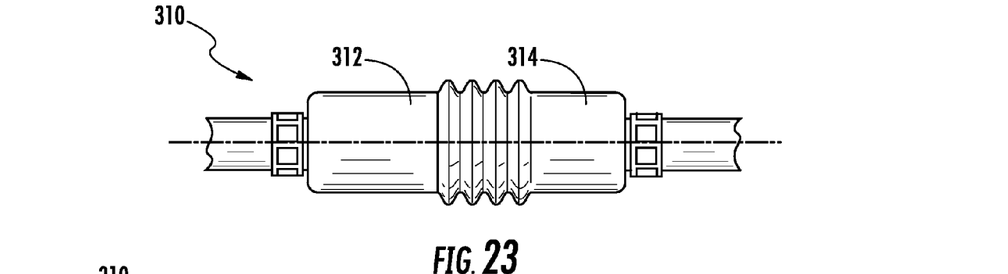
FIGS. 23-24 depict a quick connect/disconnect adaptor system with a full male portion over-mold and a female bellows over-mold which is compressed by the male over-mold, according to an exemplary embodiment.
Figure 24:
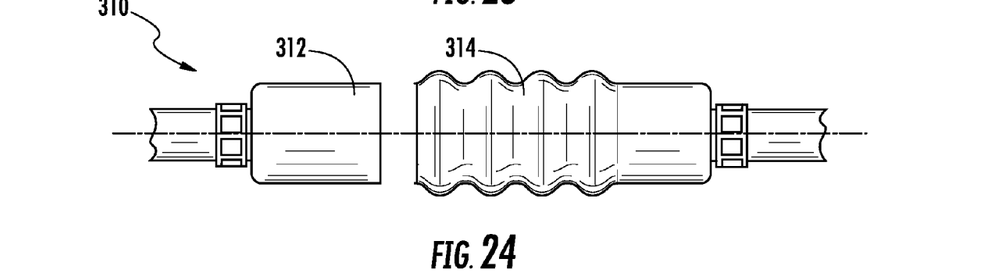

FIGS. 23-24 depict another system which protects the male portion even when disconnected. In FIGS. 23-24, system 310 includes a male portion with a full over-mold 312. The female portion likewise has a full over-mold 314 which is in a bellows configuration. Thus, when the system is connected the over-mold 314 is compressed by the male over-mold 312 as depicted in FIG. 23. When the system is disconnected, the female bellows over-mold 314 expands to cover the female portion. Accordingly, even when disconnected the male portion is protected by an over-mold thereby providing thermal protection and reducing the potential for damaging other objects.

Figure 25:
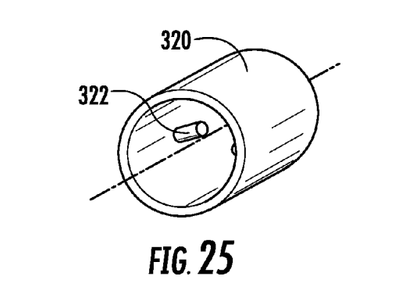
FIG. 25 depicts a male locking collar with molded or cast pins for a quick connect/disconnect adaptor system, according to an exemplary embodiment.
Figure 26:
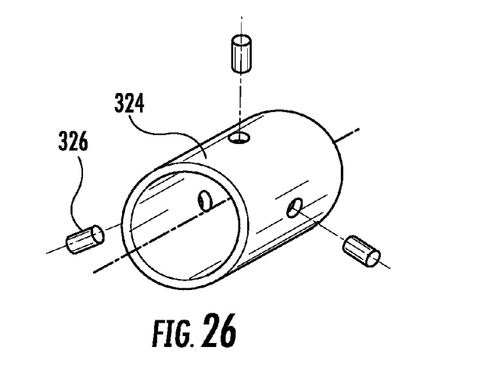
FIG. 26 depicts a male locking collar with holes formed in the collar by molding or drilling, and pins then inserted into the holes for a quick connect/disconnect adaptor system, according to an exemplary embodiment.

In at least some of the embodiments discussed above, the male couplings include locking pins that follow helical grooves in the body of the female coupling. The locking pins in various embodiments are made from a metal such as brass, steel, stainless steel, zinc, etc. Metal locking pins can be cast, extruded, integral to the male locking ring, inserted into the male locking ring, etc. In other embodiments, the locking pins are made from plastic, ABS, nylon, acetal, etc. Non-metal pins can be molded, extruded, integral to the male lock ring, inserted into the male lock ring, etc. Other materials used for the lock pin include carbon fiber, composites/combinations, ceramics, etc. FIG. 25 depicts a male locking collar 320 with molded or cast pins 322 while FIG. 26 depicts a male locking collar 324 with holes formed in the collar by molding or drilling, and pins 326 then inserted into the holes.

Figure 27:
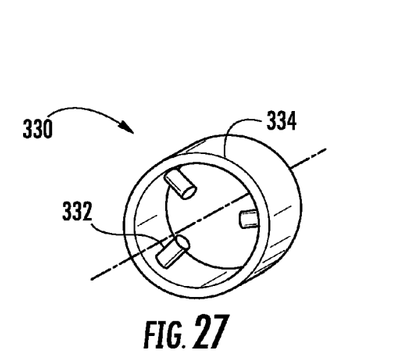
FIG. 27 depicts an embodiment wherein a pin ring is first formed by casting, molding, or inserting pins into a ring for a quick connect/disconnect adaptor system, according to an exemplary embodiment.
Figure 28:
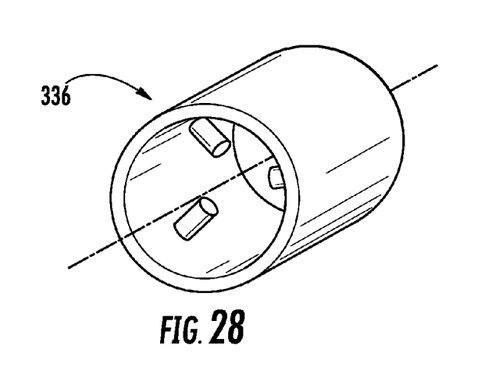
FIG. 28 depicts the pin ring of FIG. 27 after being over-molded into a male lock ring.

FIGS. 27-28 depict an embodiment wherein a pin ring 330 is first formed by casting, molding, or inserting pins 332 into a ring 334. The pin ring 330 is then over-molded resulting in the male lock ring of FIG. 28.

Figure 29:
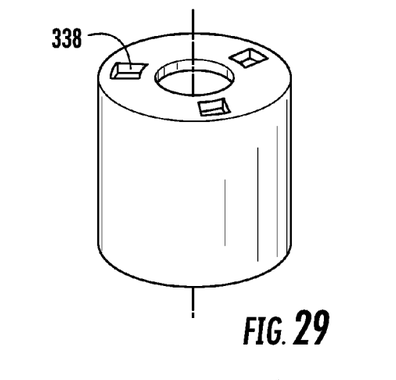
FIGS. 29 and 30 depict slots artifacts in a collar when forming pins in cast or molded embodiments for a quick connect/disconnect adaptor system, according to an exemplary embodiment.
Figure 30:
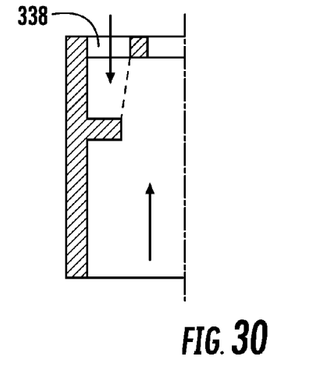
Figure 31:
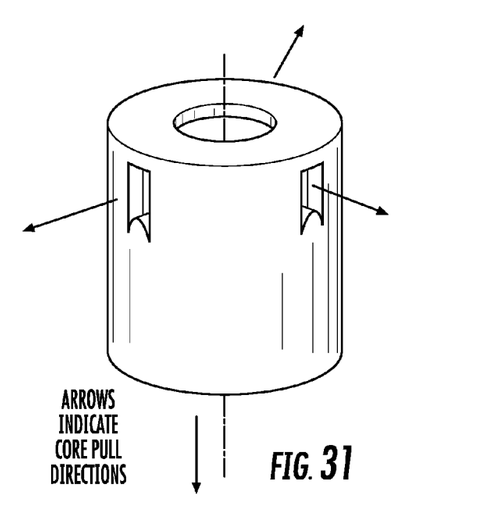
FIGS. 31-32 depict an exemplary embodiment of FIGS. 29 and 30 with slots on the end of the collar that are avoided by pulling in three directions from the sides as well as along the axis.
Figure 32:
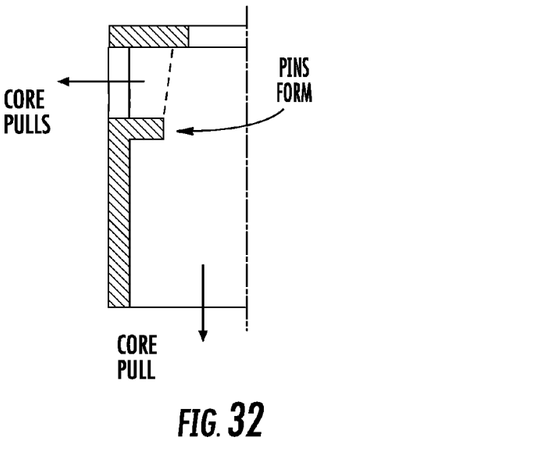

Some of the processing method described above may leave artifacts which must be considered in the design of the system. By way of example, FIGS. 29 and 30 depict slots 338 that are used in forming pins in cast or molded embodiments. In one embodiment, the slots on the end of the collar are avoided by pulling in three directions from the sides as well as along the axis. As depicted in FIGS. 31-32, this approach leaves slots in the outer wall of the collar.

Figure 33:
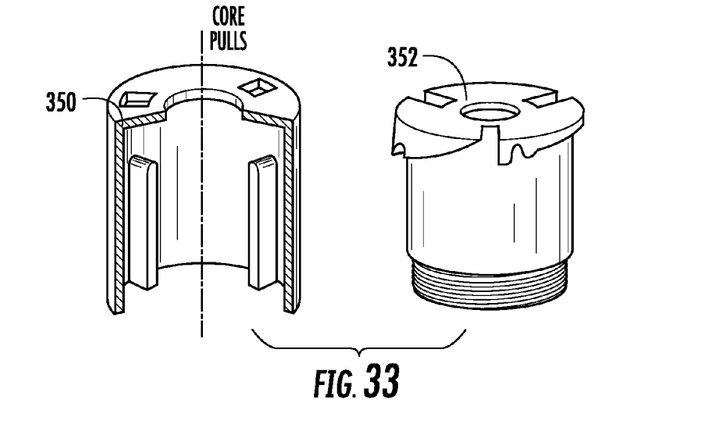
FIG. 33 depicts an exemplary embodiment with a male locking collar which is cast or molded with ribs instead of pins for a quick connect/disconnect adaptor system.

FIG. 33 depicts an embodiment with a male locking collar 350 which is cast or molded. Instead of pins, the locking collar 350 includes ribs with the top formed by cores coming in the top. The top of the rib rides the top of the slot for mechanical support when connecting. The top of the female body 352 is wider at the top and forms the top of the slot. The female body narrows below the top so the entire shape can be cast or molded except for the thread at the bottom. When disengaging, the device is rotated and pulled. Static pressure helps in the disengagement.

Figure 34:
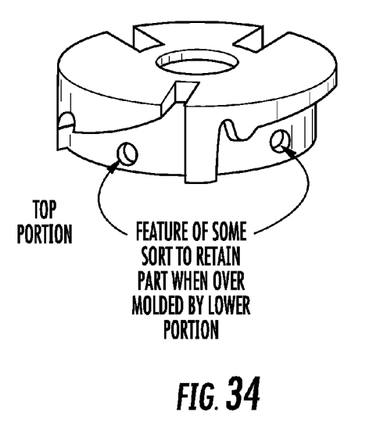
FIGS. 34-35 show the female body of FIG. 33 as a two piece over-molded construction, according to an exemplary embodiment.
Figure 35:
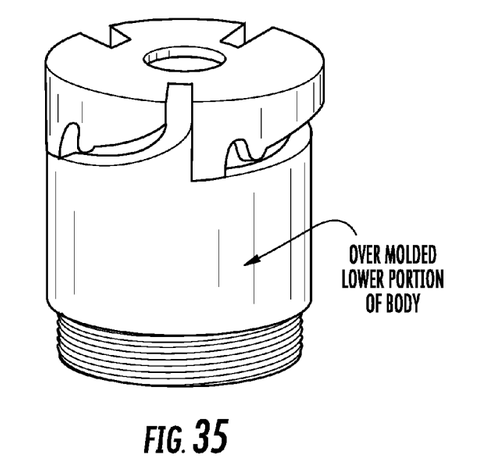

In some embodiments, the top portion of the female body 352 is first formed (see FIG. 34) and then over-molded (see FIG. 5). This allows the upper portion to be formed of one material, such as metal or a higher grade of plastic, while a less expensive material is used for the lower body portion.

Figure 36:
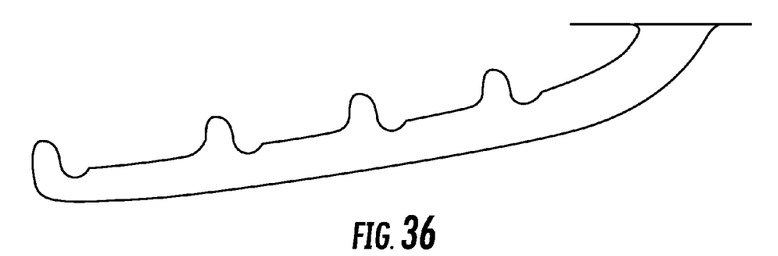
FIGS. 36 and 37 depict different helical grooves which provide for partial opening of the system, according to an exemplary embodiment.

Additionally, the slot can be used as a flow control feature. For example, FIG. 36 shows a stepped slot. This is substantially the same as the helical slot used in the embodiments above, but with additional locking points. The additional locking points can correspond to, for example, ¼, ½, ¾, full open, etc. The user will feel these locking points as the system is locked/unlocked.

Figure 37:
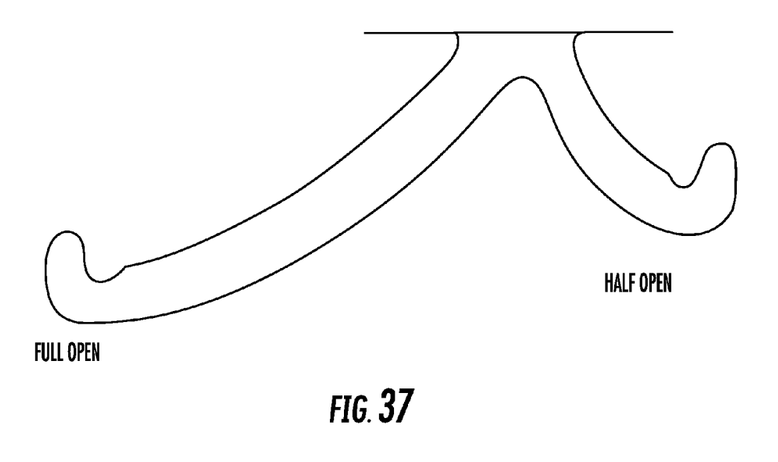

FIG. 37 depicts an embodiment of a slot where two grooves are formed. One groove provides a full open position, while the other groove provides a half open. While shown having a common mouth, the two grooves in some embodiment are offset about the component.

Figure 38:
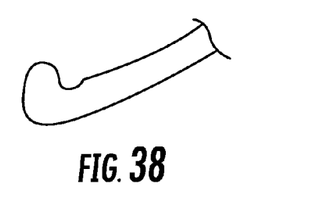
FIG. 38 depicts a helical groove configuration of FIG. 37 which provides for mechanical advantage, according to an exemplary embodiment.
Figure 39:
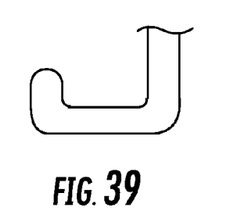
FIG. 39 depicts a helical groove configuration of FIG. 37 which does not provide for mechanical advantage, according to an exemplary embodiment.

In different embodiments, the grooves are formed differently to provide for different mechanical advantages. For example, FIG. 38 depicts a groove configuration which provides a mechanical advantage. This groove is useful particularly for embodiments in which the female component is pressurized while coupling/decoupling. Particularly in embodiments wherein the female is not pressurized, the groove may be alternatively configured as a push and turn bayonet style groove as depicted in FIG. 39 which does not provide mechanical advantage.

Figure 40:
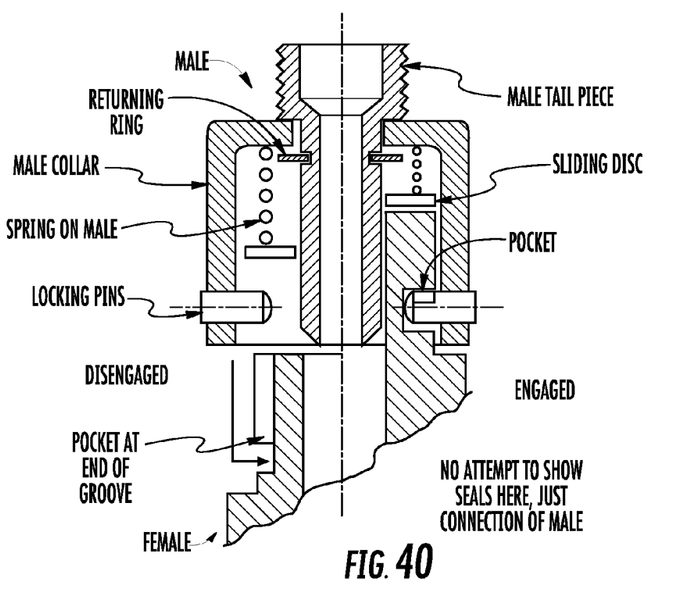
FIG. 40 depicts a quick connect/disconnect adaptor system which provides audible and tactile feedback even when the system is not pressurized, according to an exemplary embodiment.

In embodiments which do not include an automatic shut-off, the shuttle may be omitted. The spring loaded shuttle, however, pushes the male fitting away from the female fitting providing an audible and tactile feedback to the user as well as pushing the locking pins into the locking pocket. In embodiments omitting a shuttle, the same benefits can be obtained using the configuration of FIG. 40. Specifically, a spring is incorporated on the male side of the coupling instead of the female side. Accordingly, the male is inserted into the female, with the locking pins aligned with the vertical slots, until the pins bottoms out in the slots. The male is then turned the desired number of degrees and reaches the end of the horizontal slot. As the male was inserted, the spring was compressed. Accordingly, once the end of the horizontal run is reached (or the end of the sloped run in embodiments using the slot of FIG. 38), the spring pushed the pins into the pockets at the end of the slot. This allows for tactile feedback and audible feedback. Additionally, the spring assists with locking. Furthermore, the spring with the disc covers the male tail to keep debris off the tail.

The above described embodiments can be embodied as a "Y" connector, a quad, or any number of connector configurations that have no shut-offs or a gooseneck of any angle. Additionally, the above described embodiments can be embodied with shut-offs of any desired type. They can further be included with a timer, a nozzle, a sprinkler, or other lawn and garden product, any of which can be integrally formed. The above described embodiments can be used with liquid, gas, or solid material transport applications.

Figure 41:
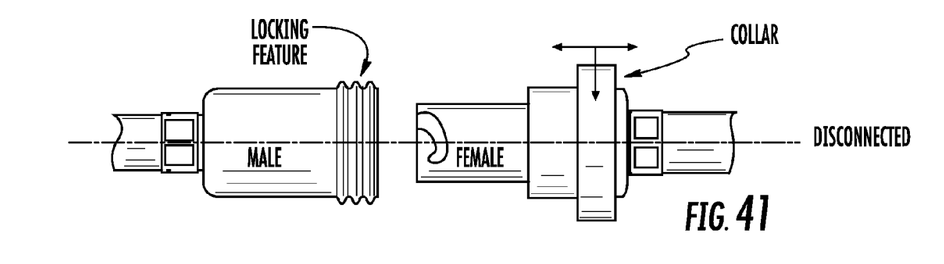
FIGS. 41-42 depict a quick connect/disconnect adaptor system which provides additional locking, according to an exemplary embodiment.
Figure 42:
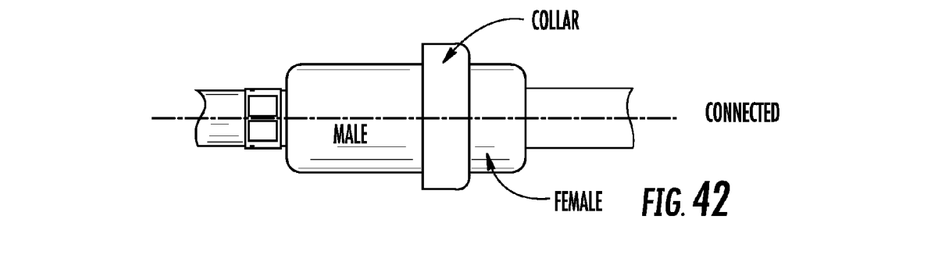

The above described embodiments can be used with a locking device such as the device depicted in FIGS. 41-42. In FIG. 41, the male and female components are connected in any of the above described embodiments. Once connected, the collar is moved forward and connected to the male thus preventing retraction of the male from the female. In the embodiment of FIGS. 41-42, there are threads on the outside of the male collar and a rotating collar on the female. In other embodiments, this configuration is reversed. Additionally, in some embodiments the threads are replaced with a bayonet type fitting.

Figure 43:
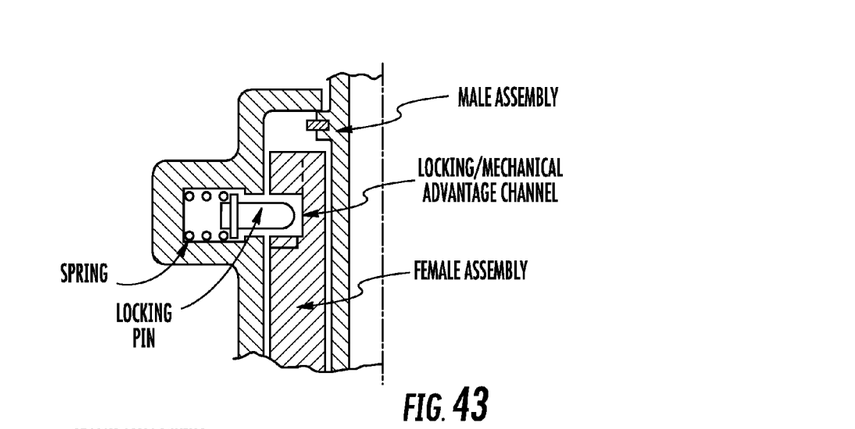
FIGS. 43-44 depict a quick connect/disconnect adaptor system wherein the male can be pushed into the female without aligning the locking pins with the female channel, according to an exemplary embodiment.
Figure 44:
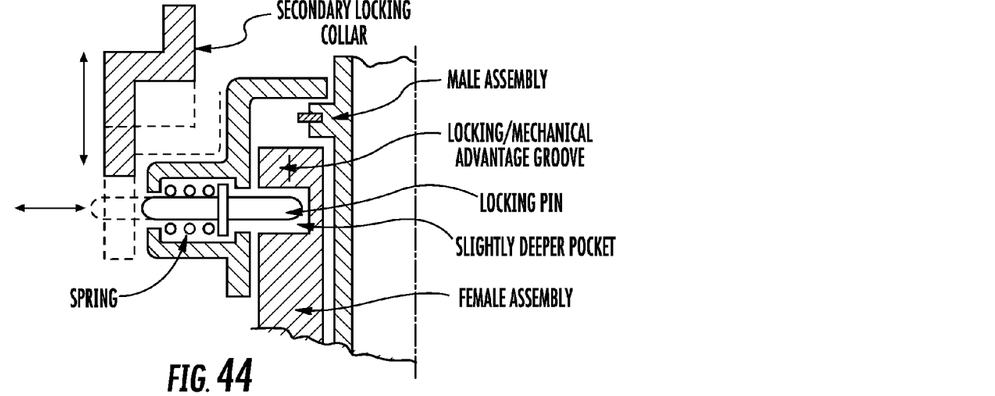

FIGS. 43-44 depict a secondary locking configuration used with any of the above described locking configurations. In some embodiments the configuration of FIG. 43 is used as the primary locking configuration. The configuration of FIG. 43 pushes the male into the female without aligning the locking pins with the female channel. Accordingly, the two components can be pushed together in any position. The pins then retract and snap into the grooves when the pins reach the groove.

FIG. 44 shows a portion of the locking pin extending through the spring. The locking pin in the locked position on the female sits in a pocket slightly deeper than the spiral groove. The pin can ride up out of this pocket and into the groove, but in doing so the side of the pin extending through the spring must protrude through a hole. When the secondary locking collar is retracted, the pin can protrude through the hole. When the collar is extended, the pin cannot protrude, thus remaining locked. The secondary collar can be moved manually via spring or magnet. The secondary collar can then be locked with threads or a bayonet arrangement.

Figure 45:
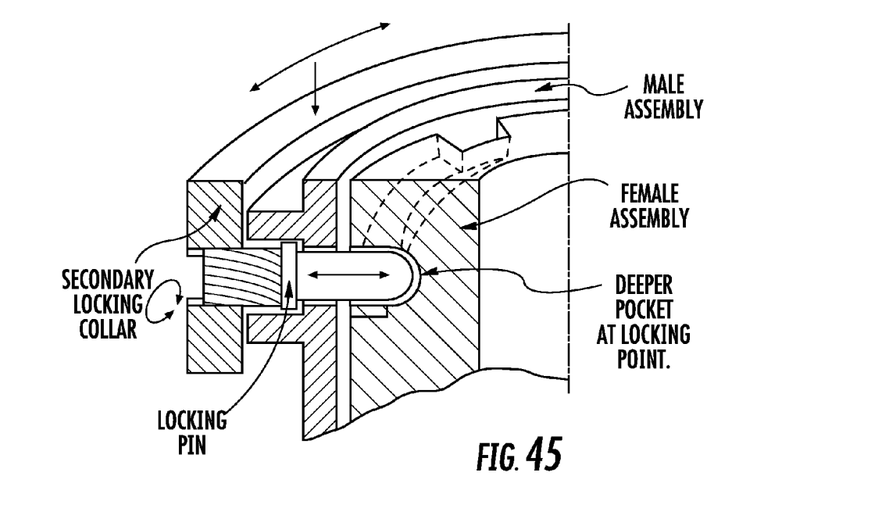
FIGS. 45-46 depict a quick connect/disconnect adaptor system wherein pins are inserted and retracted by rotation of a collar, according to an exemplary embodiment.
Figure 46:
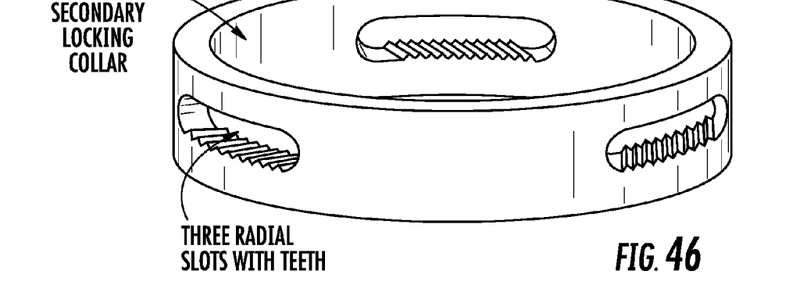

FIGS. 45-46 depicts secondary locking collar placed above the male assembly with the locking pins inserted. When the secondary locking ring is rotated in one direction, the pins go inwardly. When rotated in the opposite direction, the pins move outwardly. With a deeper pocket at the locking point, the male cannot be unlocked until the pin is retracted enough for the pin to go into the helical slots.

Figure 47:
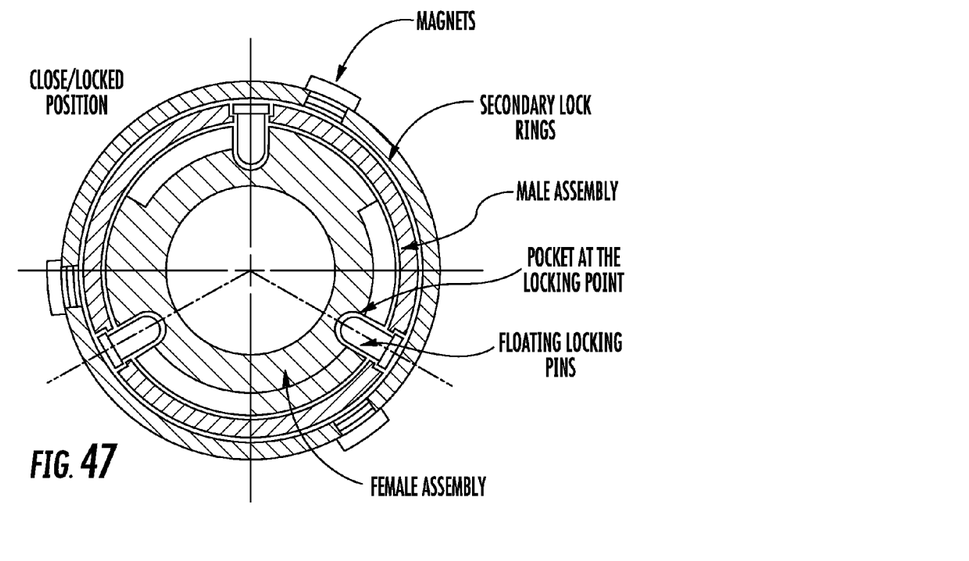
FIGS. 47-49 depict a quick connect/disconnect adaptor system wherein pins are manipulated using magnets, according to an exemplary embodiment.
Figure 48:
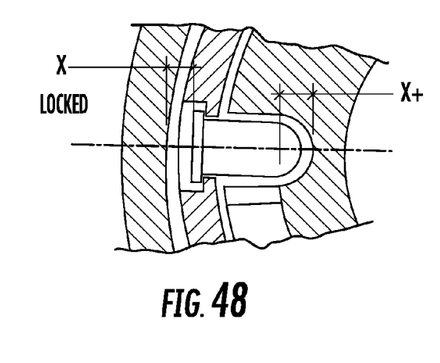
Figure 49:
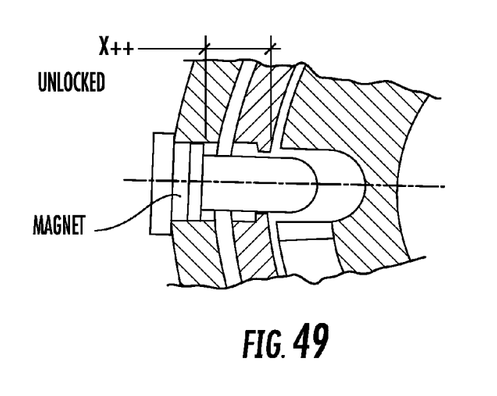

FIGS. 47-49 depict an embodiment wherein the pins are trapped within a space but are moveable. There is a slightly deeper pocket in the helical grooves at the locking points. A secondary locking ring surrounds the male collar and traps both the lock pins and a series of magnets. When the magnets are not directly outwardly of the pins, the pins are trapped and cannot move enough to unlock. When a magnet is directly outwardly of a pin (which is a magnetic material), the pin the pin is pulled away from the pocket enough to unlock.

Additional details which can be combined with the foregoing embodiments are provided in the following pages.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A quick connect and disconnect adaptor system, comprising:
   a male member having a locking collar, a pin attached to the locking collar, and a secondary locking mechanism; and
   a female member selectively coupled to the male member, the female member having a body defining a groove, a locking collar, an inner ring member, and a secondary locking device, wherein the locking collar and the inner ring member extend outward from the body;
   wherein the locking collar of the male member at least partially surrounds the body of the female member when the female member and male member are coupled together, such that the groove receives the pin and the secondary locking mechanism engages with the secondary locking device.

2. The system of claim 1, wherein the secondary locking device includes a sphere coupled to the inner ring member, wherein the sphere is movable in a first direction towards the body and in a second direction away from the body.

3. The system of claim 2, wherein the secondary locking mechanism includes a groove defined by the locking collar of the male member, wherein the sphere is selectively engageable with the groove.

4. The system of claim 2,
   wherein the locking collar of the female body is axially movable with respect to the inner ring member;
   wherein in a first axial direction, the locking collar is moved away from the sphere to permit the sphere to move in the first direction; and
   wherein the second axial direction, the locking collar engages the sphere to move the sphere in the second direction.

5. The system of claim 4,
   wherein the inner ring member includes a retaining ring, wherein the retaining ring is configured to limit an amount of axial movement of the locking collar of the female body; and
   wherein the inner ring member is attached to a biasing member in operable engagement with the locking collar, wherein the biasing member is configured to bias the locking collar in the second axial direction.

6. A quick connect and disconnect adaptor system, comprising:
   a male member having a tail and a locking collar, wherein the locking collar is coupled to a pin, and wherein the locking collar at least partially surrounds the tail to define an opening between the tail and the locking collar; and
   a female member selectively connected with the male member, the female member having a body defining a groove, wherein the body includes a ring member extending from the body and defining a slot positioned between the body and the ring member;

wherein engagement of the pin to the groove connects the male member to the female member.

7. The system of claim 6, wherein the ring member includes a locking device movable between a first position and a second position, wherein in the first position the locking device is proximate the body and in the second position the locking device is positioned away from the body.

8. The system of claim 7, wherein the locking collar of the male member defines a locking groove, wherein the locking groove is located in the slot when the female member and the male member are connected.

9. The system of claim 8, wherein the female member further includes a collar positioned outside of the ring member, wherein the collar is axially movable relative to the ring member in a first axial direction and a second axial direction, wherein in the first axial direction the collar pushes the locking device to engage with the locking groove, and wherein in the second axial direction the collar permits the locking device to move away from the locking groove.

10. The system of claim 9, wherein the collar is biased in the first axial direction via a biasing member attached to the ring member.

11. The system of claim 10, wherein the locking device is a sphere, and wherein the biasing member is a spring.

* * * * *